Dec. 11, 1928.
H. A. TOULMIN, JR
1,694,457
WATER SOFTENING APPARATUS
Filed Sept. 9, 1926   6 Sheets-Sheet 1
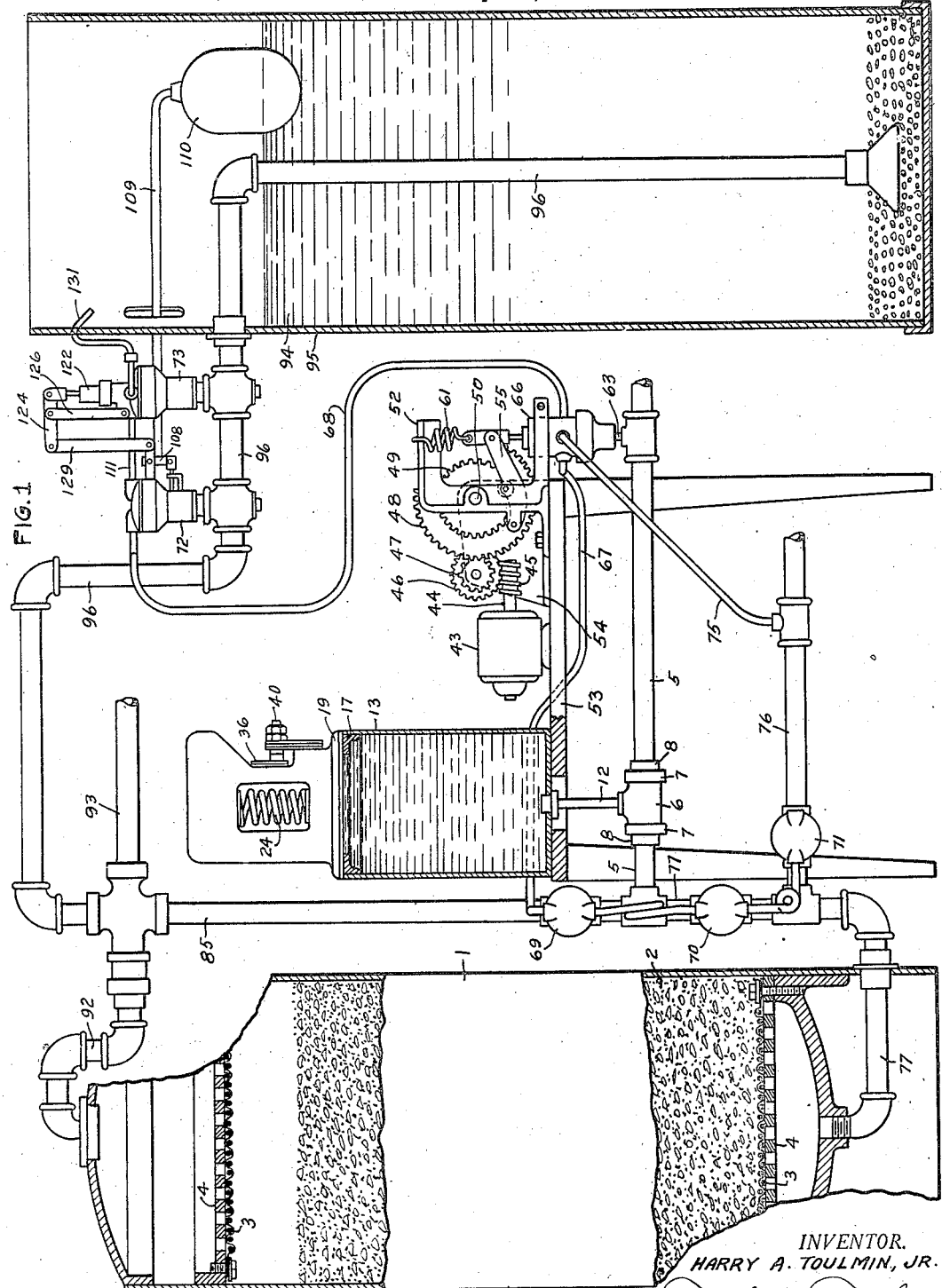
INVENTOR.
HARRY A. TOULMIN, JR.
BY Toulmin & Toulmin,
ATTORNEYS.

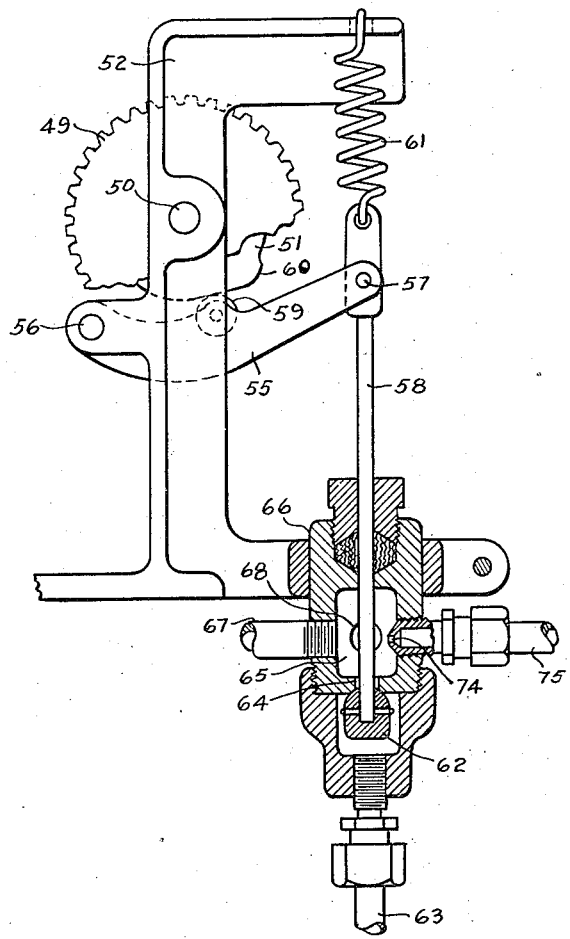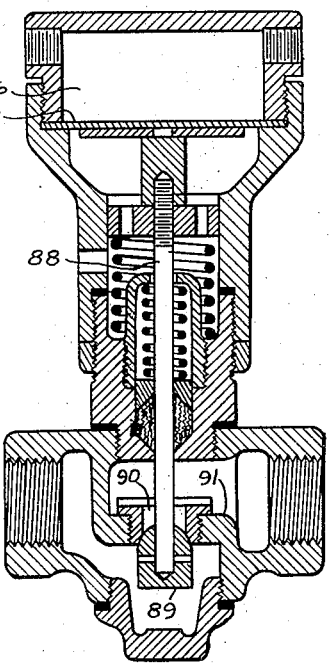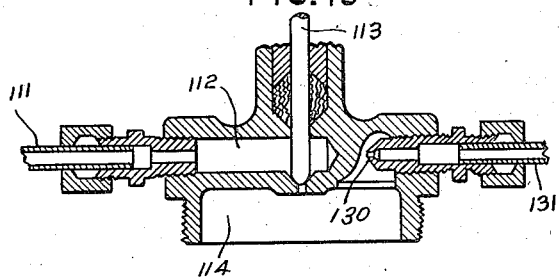

Dec. 11, 1928.
H. A. TOULMIN, JR
1,694,457
WATER SOFTENING APPARATUS
Filed Sept. 9, 1926 6 Sheets-Sheet 3
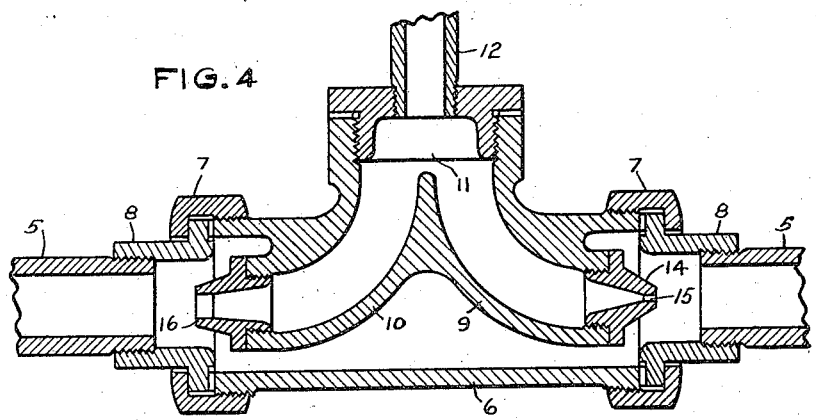
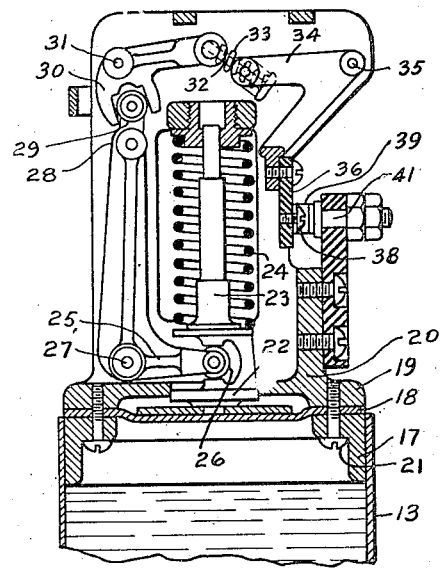
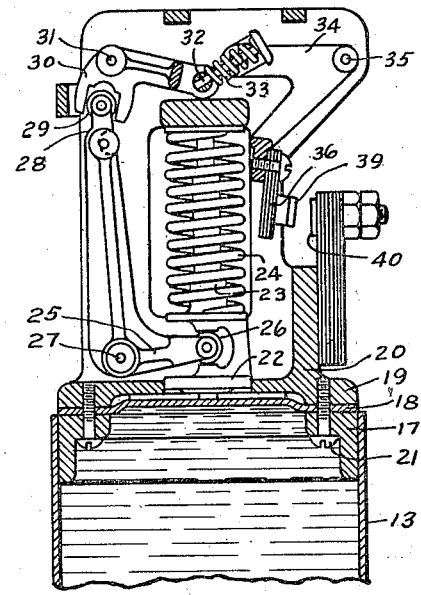
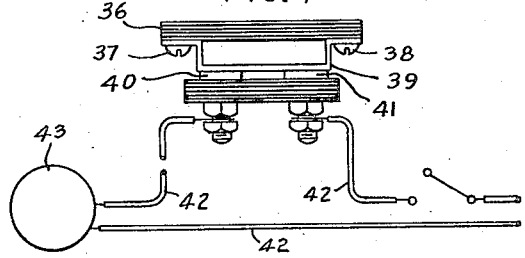
INVENTOR.
HARRY A. TOULMIN, JR.
BY Toulmin & Toulmin
ATTORNEYS.

Dec. 11, 1928.
H. A. TOULMIN, JR
1,694,457
WATER SOFTENING APPARATUS
Filed Sept. 9, 1926
6 Sheets-Sheet 4
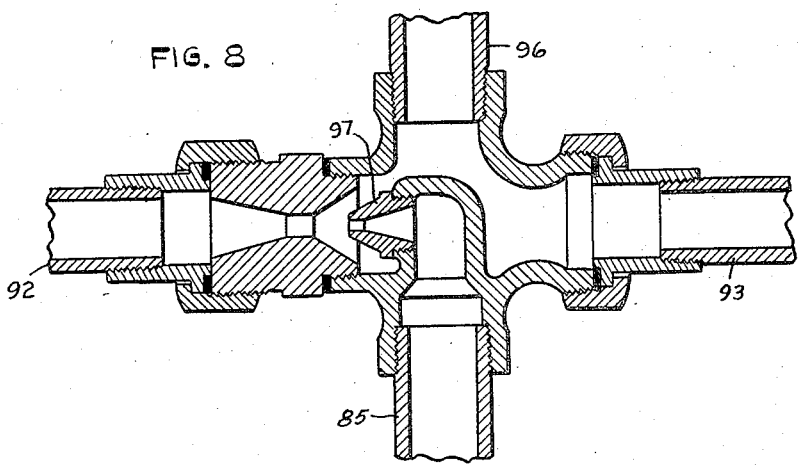
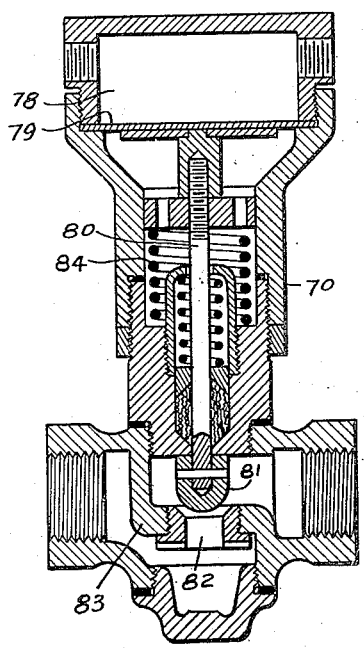
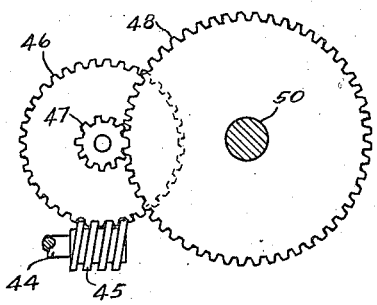
INVENTOR.
HARRY A. TOULMIN, JR.
BY
ATTORNEYS.

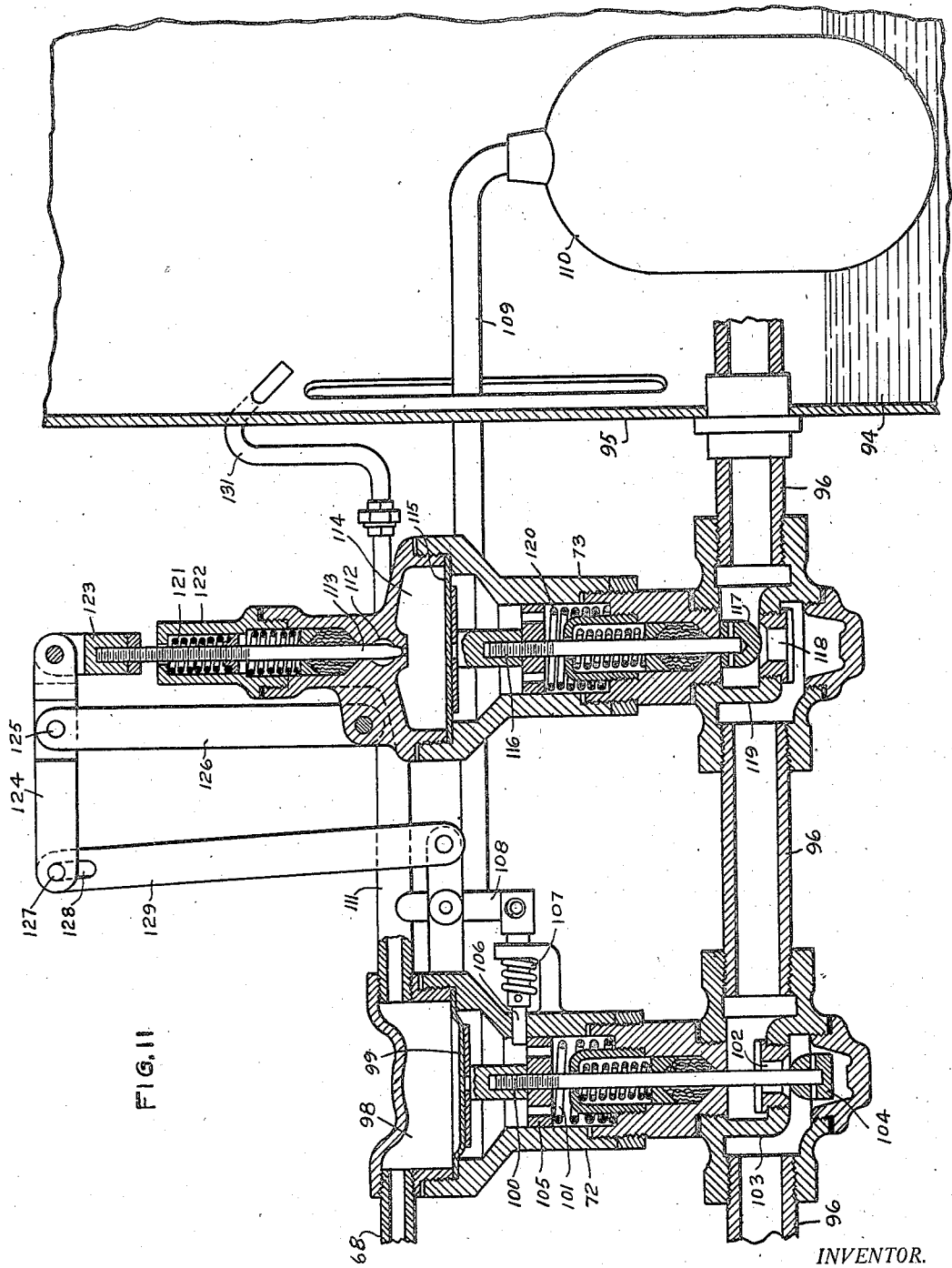

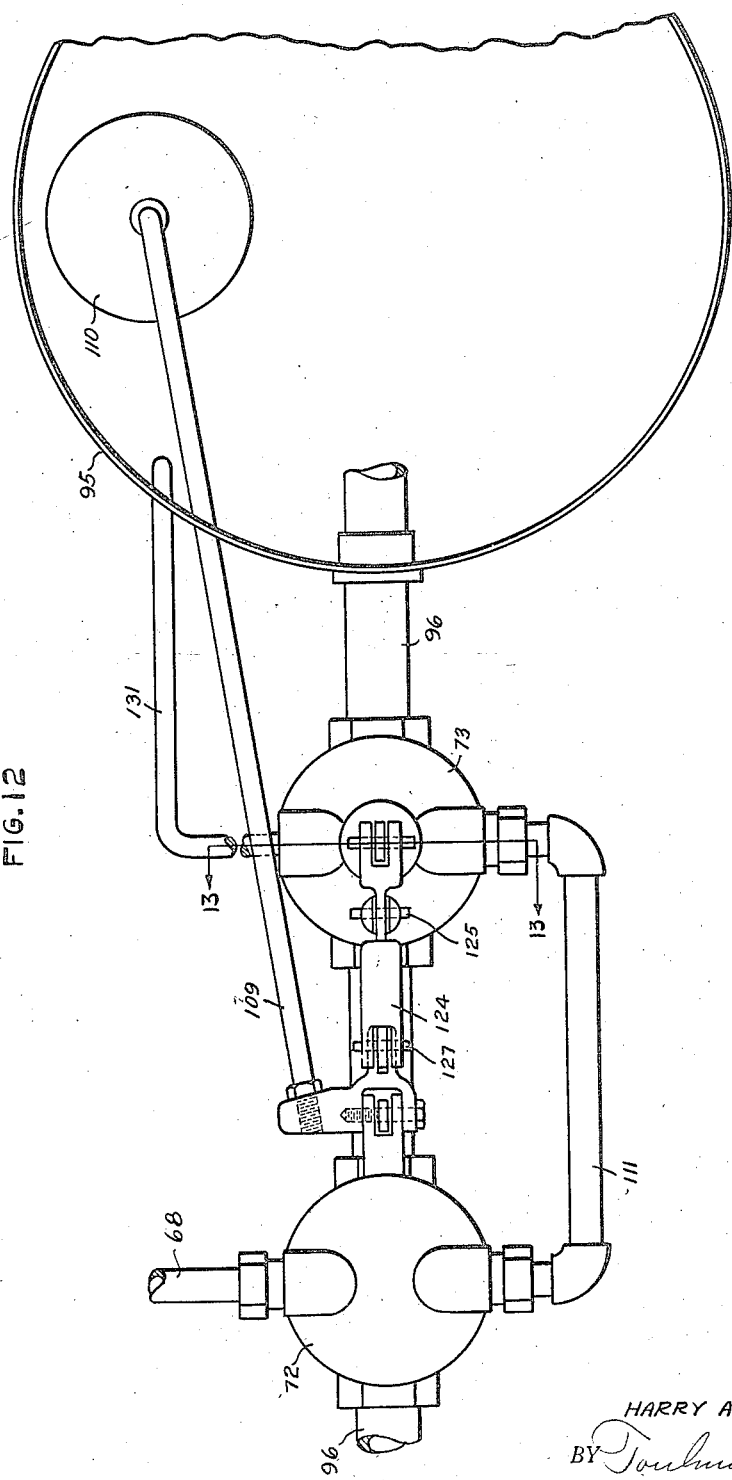

Patented Dec. 11, 1928.

1,694,457

UNITED STATES PATENT OFFICE.

HARRY A. TOULMIN, JR., OF DAYTON, OHIO, ASSIGNOR TO THE DURO COMPANY, OF DAYTON, OHIO, A CORPORATION OF OHIO.

WATER-SOFTENING APPARATUS.

Application filed September 9, 1926. Serial No. 134,559.

My invention relates to water softening apparatus.

It is the object of my invention to provide a water softening apparatus which will be automatically operated through the agency of the change in pressure in a pressure chamber connected to one of the water lines of the water softening system.

It is a further object to provide means of converting the system from softening to regenerating position and back to softening position through the increase and decrease of pressure in the pressure reservoir which controls the stopping and starting of the setting mechanism which is moved to a predetermined position to permit the change of position of the parts of the system to convert the softener from softening position to regenerating position or back to softening position.

It is a further object to provide a water softener in which the movement of the water in the incoming hard water line decreases the pressure in a pressure reservoir and thereby causes the setting mechanism to be operated so long as the water is passing through the system so that the system is operated according to the amount of water passing therethrough.

Referring to the drawings:

Figure 1 is a side elevation of the complete apparatus with the softening tank partially in section with the reservoir in section and with the brine tank in section;

Figure 2 is a detail elevation of the needle control valve partially in section with the driving gear partially broken away;

Figure 3 is a section through one of the hydrostatic control valves of the system which is normally closed;

Figure 4 is a section through the main hard water line, feed line and injector for the reservoir;

Figure 5 is an elevation partially in section of the pneumatic switch and the top of the reservoir with the switch in closed position when pressure in the reservoir is decreased;

Figure 6 is a similar view with the switch in open position showing the parts as arranged when the pressure is at its maximum;

Figure 7 is a wiring diagram of the switch and motor;

Figure 8 is a section through the injector mechanism for drawing the brine into the softening tank;

Figure 9 is a section through one of the control valves normally open;

Figure 10 is a detail view of the driving gear from the motor armature shaft to the gear for the cam which operates the needle valve shown in Figure 2;

Figure 11 is a section through the brine tank, refill valve and brine valve mechanism;

Figure 12 is a plan view thereof; and

Figure 13 is a section on the line 13—13 of Figure 12.

Referring to the drawings in detail, 1 is a softening tank containing softening material 2 resting on the screen 3 over the grating 4. A similar screen and grating is shown located at the top of the tank. 5 is an incoming hard water line in which is located a fitting consisting of a casing 6 attached to the hard water line by the collars 7 and sleeves 8. This fitting contains a pair of diverging arms 9 and 10 which communicate with the hard water line 5 at their free ends and merge into one another into the chamber 11 at their other ends, which chamber 11 is connected to the pipe 12 that leads to the pressure reservoir 13.

The arcuate pipe 9 has a fitting in the end thereof designated 14 provided with a small opening 15 which allows the water in the pipe line 5 to enter under pressure when the water in the pipe line is not in movement due to the water passing through the water softening system.

The other pipe 10 is provided with an injector mechanism generally designated 16 adapted to draw water from the reservoir 13 when the water is passing through the pipe 5 under pressure to the water softening system, thereby setting up a suction in the pipe 10 and pipe 12 withdrawing the water from the reservoir 13 and reducing the pressure therein.

When this movement of water has not taken place, the water will pass through the fine opening 15 and through the opening of the injector 16 building up the pressure in the reservoir, but as the opening 15 is not large enough to permit this building up of pressure to take place when the water is moved in the pipe 5 and at the same time the water is being drawn through the pipe 10 no building up of pressure will take place when the water is flowing through the pipe 5 to the softener.

The reservoir 13 has mounted on the top thereof a switch of any desired character, one form of which I have shown in the drawings. The switch shown is of the pressure type consisting of a supporting collar 17 mounted on the top of the reservoir 13. On this collar is mounted a diaphragm 18, the margin of which rests on the collar 17 and is held in position by the flange 19 of the base casting 20 of the switch. Bolts 21 join the diaphragm and the associated parts to one another as illustrated.

This diaphragm engages with the base 22 of a switch plunger 23, which is normally in the position shown in Figure 5 due to the pressure of the spring 24.

In the jaws of the base 22 is located one arm of a bell crank 25 carrying a roller 26. This bell crank is pivoted on the frame 20 at 27. The other arm of the bell crank 28 has a roller 29 engaging with the jaws 30 of a second bell crank pivoted at 31 on the frame, which bell crank carries a connecting pin 32 and a helical spring 33, the other ends of which are mounted on the arm 34 of a third bell crank pivoted at 35 on the frame. This third bell crank carries a plate of insulation 36 and contact members 37 and 38 jointed together by the electrical connector 39. These contacts engage the stationary contacts 40 and 41 which are connected by the wires 42 to a source of current and the motor 43.

As the pressure in the reservoir increases to its maximum, the contacts are broken and the circuit is broken, but, when the pressure decreases, the contacts are made and the circuit is completed through the agency of the spring 24 which forces the switch plunger 23 downwardly.

I do not claim anything in connection with this particular switch, but utilize it as one of the forms which is suitable and adaptable for this purpose.

A float switch may be utilized instead of a pressure switch, which will change its position due to the change in level of the water in the reservoir 13.

The motor 43 operates its armature shaft 44 and the worm 45 thereon. This, in turn, operates suitable gearing 46, 47, 48 and 49. The last mentioned gear 49 is mounted on the shaft 50. On this shaft is carried a cam 51 in the frame 52 mounted on the table 53. This table also supports the reservoir 13 and the motor 43 as well as the frame 54 supporting the gear connecting the motor and the cam.

Pivoted upon the frame 52 is a cam follower arm 55 pivoted on the frame at 56 and having its free end pivotally connected at 57 to the needle valve stem 58. This cam follower carries a roller 59 which operates upon the margin of the cam 51. When the high point of this cam designated 60 engages the roller it depresses the valve stem 58 against the resistance of the spring 61 and depresses the valve member 62 of the needle valve carried on the valve stem 58 admitting hydrostatic pressure through the line 63 from the hard water inlet line 5. This pressure enters the passageway 64 into the chamber 65 in the needle valve casing 66 supported by the bracket 52, whence it passes into the pipe 67 and pipe 68. The pipe 67 conveys hydrostatic pressure to the valves 69, 70 and 71 known respectively as the down flow control valve 69, up flow control valve 70 and drain valve 71. The pipe 68 conveys hydrostatic pressure to the refill valve 72 and the brine valve 73.

When the system is in softening position, it is necessary to drain off the accumulated hydrostatic pressure in the chamber 65, which is done by permitting the water to escape through the small opening 74 into the drain pipe 75 which is connected to the main drain pipe 76.

The hard water coming in through the pipe line 5 enters the pipe 77 and proceeds past the valve 70 to the bottom of the softening tank. This valve 70 is normally open and is not closed until the rostatic pressure in the line 67 serves to close it. Its construction is seen in Figure 9. The valve consists of a diaphragm pressure chamber 78, a diaphragm 79, a valve stem 80 and a valve member 81 which closes the port 82 in a partition 83 located in the pipe line 77. A spring 84 normally maintains the valve in open position. The water is prevented from going up the pipe line 85 by the valve 69 which is normally closed and which will be seen illustrated in detail in section in Figure 3. This valve consists of a diaphragm chamber 86, a diaphragm 87, a valve stem 88 and a valve member 89 normally closing a port 90 in a partition 91 in the pipe line 85.

The drain valve 71 is similarly constructed and is normally closed.

The water during the softening operation passes through the pipe 77 up through the mineral 2 and out the top through the pipe 92, whence it passes out the service line 93.

When the needle valve is open the hydrostatic pressure opens the drain valve 71 shutting the upflow valve 70 and opening the down-flow valve 69 so that the water passes upwardly through the pipe 85, through the pipe 92, down through the softening material 2, through the lower end of the pipe 77 and out the drain pipe 76. In doing so, the hard water draws brine 94 out of the brine tank 5, through the brine pipe 96 by the action of the injector mechanism, shown in Figure 8 and designated generally 97.

In this brine line 96 is located a refill valve and there is also located a valve in the brine line and a refill valve designated 72 and 73.

In Figures 11, 12 and 13, which illustrate these valves in some detail, it will be observed that the brine valve consists of a hydrostatic chamber 98 having a diaphragm bottom 99 and a valve stem 100 which is normally moved into the uppermost position by the spring 101 to close the opening 102 in the partition 103 by the valve member 104. This valve stem 100 carries a locking disk 105. This disk is engaged by the locking plunger 106 impelled by the spring 107 to lock the refill valve 72 in its open position. The locking plunger is controlled by a bell crank 108, a float arm 109 and a float 110 operating in the brine tank 95.

The hydrostatic chamber 98 is connected by a pipe 111 to a passageway 112 controlled by a needle valve 113 which controls the admission of hydrostatic pressure to the hydrostatic chamber 114 to the brine valve 73. This brine valve has a bottom composed of a diaphragm 115 which in turn operates a valve stem 116 and a valve member 117 that is adapted to close the opening 118 in the partition 119 in the brine line. This valve is normally held open by the spring 120.

The admission of the hydrostatic pressure to the chamber 114 is controlled by the needle valve 113 which in turn is yieldingly held in closed position by the spring 121 within the cap 122. The upper end of the valve stem is connected to a link 123 pivoted on a lever 124. This lever is supported pivotally at 125 on the support 126 which is in turn pivoted upon the casing of the valve 73. The free end of this lever 124 is provided with a pin 127 working in a slot 128 in a link 129, the other end of which is connected to the bell crank 108.

In operation, when the softening apparatus is in softening position and is softening the water, the brine valve is open and the refill valve is closed. When the regeneration operation starts, the hydrostatic pressure depresses the refill valve 104 and opens it.

The brine valve is normally open by reason of the spring 120 and brine is drawn from the brine tank by the injector action hereinbefore described.

This withdrawal of the brine continues until the float 110 descends to a predetermined point. In the meanwhile the refill valve 104 has been locked open by means of the plunger 106 which has been pressed into locking position by the spring 107. There is a loose connection between this plunger 106 and the bell crank 108 permitting this.

When the float has descended to a predetermined position and enough brine has been withdrawn, the bell crank 108 will pull down the link 129 lifting the needle valve 113 admitting hydrostatic pressure through the pipe 111 opening 112 into the chamber 114 closing the brine valve 117 and preventing any further supply of brine.

Water continues to pass through the water softener without brine for a limited period, washing the brine through the drain and then the roller 59 drops off the high point 60 of the cam 51 and the needle valve 62 closes. This results in a decrease of the hydrostatic pressure in chambers 98 and 114.

The diaphragm valves would accordingly normally return to their inoperative position due to the springs 101 and 120, but the refill valve 72 is locked open by the plunger 106. There is nothing to hold the brine valve to its open normally inoperative position and it does so, thus both valves are open in the position shown in Figure 11. Water, therefore, can pass through the pipe 96 and does so from the part of the water going to service during the first part of the flow to service during softening.

This water is refill water to refill the brine tank 95. Such refill water continues to flow until the float 110 and float arm 109 rise withdrawing the locking plunger 106 through the bell crank 108, allowing the refill valve 104 to close shutting off any further supply of water to the brine tank.

Surplus water can drain from the diaphragm chamber 114 through the fine bleed valve 130 to the bleed pipe 131 which empties into the brine tank 95.

It will thus be seen that I am enabled to operate a water softening system automatically, only operating it when water is being drawn through the system and therefore only regenerating it when a predetermined quantity of water is being drawn through the system.

I synchronize the passage of water with the pressure in the pressure reservoir and thereby control the operation of the setting mechanism so that the setting mechanism is moved with the water through the system and then only. When the water stops, the setting mechanism is stopped but the amount of movement of the setting mechanism which has already taken place is not lost so that there is perfect synchronism between the passage of water and the setting of the mechanism. My invention therefore eliminates water meters and clocks for timing such mechanism.

It will be understood that I desire to comprehend within my invention such modifications as may be necessary to adapt it to varying conditions and uses.

Having thus fully described my invention, what I claim as new and desire to secure by Letters Patent, is:—

1. In an automatic water softening apparatus, a container for softening material, a container for regenerating material, means to deliver water under pressure to the system, a pressure reservoir outside of said means but connected therewith, a switch operated thereby, a circuit controlled by said switch, means to convert said softening apparatus from softening position to regenerating position and back to softening position, and means controlled by said circuit for operating said converting mechanism.

2. In an automatic water softening apparatus, a container for softening material, a container for regenerating material, means to deliver water under pressure to the system, a pressure reservoir outside of said means but connected therewith, a switch operated thereby, a circuit controlled by said switch, means to convert said softening apparatus from softening position to regenerating position and back to softening position, and means controlled by said circuit for operating said converting mechanism, said mechanism consisting of setting mechanism and mechanism to control the hydrostatic pressure to be applied to operating the converting mechanism.

3. In an automatic water softening apparatus, a container for softening material, a container for regenerating material, means to deliver water under pressure to the system, a pressure reservoir outside of said means but connected therewith, a switch operated thereby, a circuit controlled by said switch, means to convert said softening apparatus from softening position to regenerating position and back to softening position, and means controlled by said circuit for operating said converting mechanism, said mechanism consisting of setting mechanism and mechanism to control the hydrostatic pressure to be applied to operating the converting mechanism, and means so controlled for regulating the admission of regenerating material to said system and the replenishing of the regenerating material with fresh water.

4. In an automatic water softening system, a pressure line, a pressure reservoir, means to reduce the pressure in said pressure reservoir when the water flows in said pressure line, and means controlled by the pressure in said pressure reservoir for converting said water softening system from softening position to regenerating position and from regenerating position to softening position.

5. In an automatic water softening apparatus, a pressure line, a pressure chamber to collect fluid therefrom separate from the water softening system and independent of the conditions therein, means controlled by the pressure of fluid in said collecting means controlling the converting of the water softening apparatus from softening position to regenerating position.

6. In an automatic water softening apparatus, a pressure line, a pressure chamber to collect fluid therefrom separate from the water softening system and independent of the conditions therein, means controlled by the pressure of fluid in said collecting means controlling the converting of the water softening apparatus from softening position to regenerating position, and means for regulating the quantity of liquid in said collecting means according to the passage of fluid through said pressure line.

7. In an automatic pressure system, a pressure line having fluid therein under pressure, a pressure reservoir outside of the pressure line, a switch controlled by the pressure in said reservoir, a circuit connected to said switch, a setting mechanism, a motor for operating said setting mechanism connected in said circuit, and mechanism controlled by said setting mechanism for converting said softener apparatus from softening position to regenerating position and back to softening position at predetermined intervals according to the quantity of fluid passing through said system.

8. In an automatic pressure system, a pressure line having fluid therein under pressure, a pressure reservoir separate from the line, a switch controlled by the pressure in said reservoir, a circuit connected to said switch, a setting mechanism a motor for operating said setting mechanism connected in said circuit, and mechanism controlled by said setting mechanism for converting said softener apparatus from softening position to regenerating position and back to softening position at predetermined intervals according to the quantity of fluid passing through the system, said converting mechanism consisting of a valve controlled by the setting mechanism to admit hydrostatic pressure to a plurality of valves for controlling the softening and regenerating operations in the system, and a plurality of hydrostatic valves for said apparatus.

9. In an automatic water softening apparatus, a pressure line, a reservoir outside of but connected therewith, water softening apparatus connected therewith, means between said pressure line and said reservoir for admitting fluid to said reservoir when the fluid is not being drawn through the water softening system and for withdrawing fluid from said reservoir when the water is being passed through the water softening system, mechanism for converting said water softening system from softening to regenerating and back to softening, and means controlled by the state of the water in said reservoir for operating said converting mechanism whereby the softener is converted according to the amount of water which passes through the water softening system.

10. In a water softening apparatus, a pressure line, a reservoir outside of but connected therewith, means to admit pressure from the pressure line to the reservoir, means to withdraw fluid from the reservoir when water is passing through the pressure line, a tank containing water softening material connected to the pressure line, a brine tank, a drain line, said line for conveying fluid to the water softening tank having upper and lower branches leading to the top and bottom of the tank, hydrostatic valves therein, a hydrostatic valve in the drain line, a service line connected to the top of the tank, a brine line connected to the top of the tank and to the brine tank, an injector associated with said brine line and the line leading to the top of the tank, a brine valve, a refill valve, a needle valve connected to said pressure line, hydrostatic lines leading from said needle valve to said brine and refill valve and to said valves in the lines leading to the softener and to the drain, a pressure switch on said reservoir, an electrical circuit, a motor therein and means driven by said motor to operate a cam; a cam and means controlled thereby for operating said needle valve.

11. A water softening system having a brine tank, a water softening tank, lines connecting said tanks and leading to service, an inlet water line under pressure, the fitting therein having a pair of arcuate passageways respectively directed to the incoming side and exit side of the pressure line and having their other ends merging into an exit line to a reservoir, a restricted opening in the arcuate passageway towards the incoming passageway, injector mechanism associated with the other opening away from the incoming pressure, a reservoir and means controlled by the reservoir for converting the system from softening to regenerating position and from regenerating position to softening position.

12. In a water softening system, a pressure line, a hydraulic pressure switch connected to said line controlled by the hydraulic pressure in the line, injector means to control the pressure from the line to the hydraulic pressure switch, said line being connected to the water softening system and said switch being adapted to start and stop the controlling mechanism for the system, controlling mechanism, and means for operating the water softening system, and means of operating said controlling mechanism.

In testimony whereof, I affix my signature.

HARRY A. TOULMIN, Jr.